Figure 1:
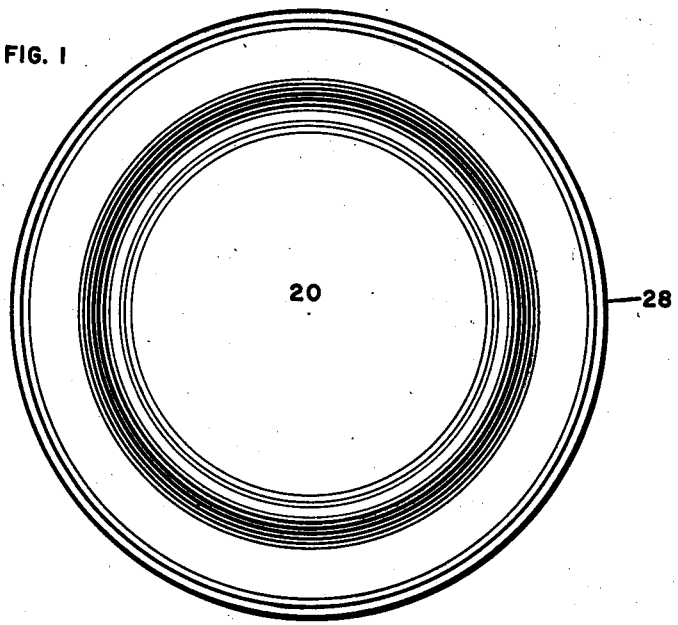
Figure 2:
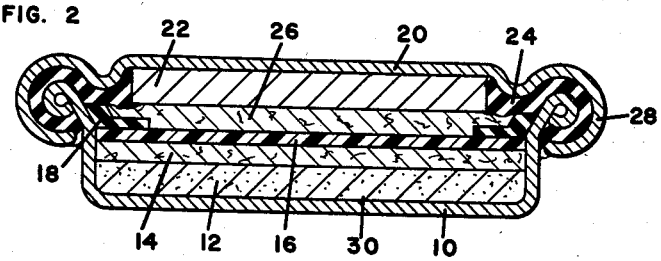

June 3, 1958   J. W. RHYNE, JR   2,837,590
MOLYBDENUM ANODE CELL
Filed Oct. 3, 1956

INVENTOR
John W. Rhyne, Jr.

BY *m.w.Gaula*

ATTORNEY 2,837,590
Patented June 3, 1958

2,837,590
MOLYBDENUM ANODE CELL

John W. Rhyne, Jr., Lancaster County, Pa., assignor to Hamilton Watch Company, Lancaster, Pa., a corporation of Pennsylvania Application October 3, 1956, Serial No. 613,648

6 Claims. (Cl. 136—100)

This invention relates to electric current producing cells and more particularly relates to alkaline dry cells.

It is an object of the present invention to provide improved cells of the foregoing type.

It is another object of the invention to provide an improved alkaline dry cell having a molybdenum anode.

These and further objects and advantages of the invention will become more apparent upon reference to the following specification and claims and appended drawing which shows a disc type dry cell constructed according to the invention.

The basic principle of a galvanic cell is the utilization of an oxidation-reduction reaction to produce a flow of electrons through a conductive circuit. The process of oxidation is one by which the positive valence of an element is increased or, in terms of electronic charges in the configuration of the atom consumed, electrons are lost. Reduction is defined as a process by which the positive valence is decreased or electrons are gained by the atom or ion in question. Reduction is the reverse of oxidation and these processes normally occur simultaneously in such combination that the total number of electrons released in the oxidation reaction is equal to the number gained in the reduction reaction.

In the application of an oxidation-reduction reaction to produce a current in a battery the two half reactions are separated so that the exchange of electrons between the substance being oxidized and that being reduced occurs only when an external conductor is provided between the two substances. This also requires that the two reactants be separated by some medium which will not conduct electronically but will allow free interchange of ions between them. The reason for this is that atoms losing electrons become positively charged and if not removed from the electrode will lend to it a positive charge thereby reducing the tendency of electrons to leave that electrode. A similar situation would exist at the other electrode and this effect is known as polarization. In order to prevent or reduce this phenomenon a depolarizing means is provided to remove or neutralize the charges.

The primary reaction that occurs at the anode is that of oxidation of some substance, usually a metal, to form positive ions and a release of electrons which flow through an external conductor to cause reduction of the cathode material. The reaction, however, in practice is not a simple oxidation reaction and reactions other than those desired generally take place when an attempt is made to produce a satisfactory current producing primary cell. Thus in the case of a cell using a zinc anode and a sodium hydroxide electrolyte, a large number of sequential reactions may occur in which the zinc ion attaches water molecules to it by coordinate-covalent bonds and these groups then react with hydroxide ions to form further complex groups which in turn again react and so on.

In addition to these reactions there are certain secondary reactions which may occur at the anode. Considering as an example a cell having a zinc anode, a mercuric oxide cathode, and a sodium hydroxide electrolyte, it is found that the zinc is capable of reducing both the mercuric oxide to mercury and the combined hydrogen in the electrolyte to hydrogen gas. Since the mercuric oxide is separated from the zinc, the reaction between these two substances can only take place when the external circuit is closed. However, the electrolyte containing the reducible hydrogen is in contact with the zinc, thus this reaction may take place at any time unless suitable steps are taken to suppress the reaction. These have, in the past, included amalgamation of the zinc and other metallic surfaces in contact with the zinc, or other means of providing surfaces with a high hydrogen overvoltage, and/or saturating the electrolyte with the zinc oxide in order to suppress this secondary reaction.

Because of the complexity of the reactions occurring at the anode in dry cells in general and in alkaline dry cells in particular, it is impossible to foretell with any degree of accuracy the suitability of any particular metal as an anode material. Generally speaking commercial cells have been restricted to the use of zinc although certain other materials such as magnesium and indium have been suggested.

We have now found that a very satisfactory alkaline cell may be constructed utilizing molybdenum as an anode material. Molybdenum is theoretically capable of giving a six electron oxidation change and such a change has been found obtainable in practice. It is believed that the reaction occurring at the anode of an alkaline cell using molybdenum as the anode material is that between the molybdenum and the electrolyte to give

$$Mo + 8OH^- = MoO_4^= + 4H_2O + 6e^-$$

Since molybdenum possesses a high capacity per unit volume, 17,100 MAH per cc. as compared to 5860 MAH per cc. for zinc, a cell using this material as an anode possesses great advantages where space is at a premium, as for example, in a self-contained battery powered electric watch. The use of molybdenum also provides a longer shelf life than zinc due to its lower reaction potential with the electrolyte, thus reducing hydrogen formation and self consumption to a minimum.

The molybdenum anode is preferably a pressed consolidated pellet of powdered molybdenum. Any alkali metal hydroxide is suitable as an electrolyte and sodium hydroxide has been found most satisfactory, although potassium or lithium hydroxide may also be used. The cathode depolarizer is preferably comprised of a consolidated mass of electrolytically reducing oxygen yielding compound, such as mercuric or mercurous oxide or silver oxide or silver peroxide.

Referring to the drawing there is shown one embodiment of the invention wherein the cell comprises a wafer type cell described in detail in assignee's copending application Serial No. 558,151, filed January 9, 1956. This cell consists of a cathode container 10 containing, for example, a consolidated mass of mercuric oxide which may have a small amount of graphite mixed therewith to increase the conductivity thereof. Over the cathode depolarizer there is disposed a layer or disc of absorbent material 14 of porous paper or similar unreactive absorbing material. This porous material carries the electrolyte for the cell which may be sodium hydroxide. A barrier 16 which is non-conductive electronically but which allows free interchange of ions therethrough overlies the absorbent material 14 and may consist of an unreactive microporous absorbent material such as that material known in the trade as Synpor (microporous polyvinyl chloride), parchment paper, or other similar unreactive microporous material. For best results, the barrier 16 may be as described in assignee's copending application Serial No. 558,151. The upper half of the cell comprises an anode container 20 containing an anode 22 which consists of powdered molybdenum consolidated into a solid mass. This is sealed into position by means of a washer 24. A further layer of porous material 26 saturated with electrolyte covers the barrier 16 and engages the undersurface of the anode 22. The anode and cathode containers are fastened together by crimping the anode container to the cathode container as shown at 28.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A primary alkaline dry cell comprising an anode substantially completely consisting of molybdenum, an alkaline electrolyte, and a depolarizer cathode including an electrolytically reducible oxygen yielding compound.

2. A primary alkaline dry cell comprising an anode substantially completely consisting of powdered molybdenum consolidated into a solid mass, an alkaline electrolyte, and a depolarizer cathode including an electrolytically reducible oxygen yielding compound.

3. A primary alkaline dry cell comprising an anode substantially completely consisting of powdered molybdenum consolidated into a solid mass, an alkali metal hydroxide electrolyte, and a depolarizer cathode including an electrolytically reducible oxygen yielding compound.

4. A primary alkaline dry cell comprising an anode substantially completely consisting of powdered molybdenum consolidated into a solid mass, an alkali metal hydroxide electrolyte, and a mercuric oxide depolarizer cathode.

5. A primary alkaline dry cell comprising an anode substantially completely consisting of powdered molybdenum consolidated into a solid mass, an alkali metal hydroxide electrolyte, and a silver oxide depolarizer cathode.

6. A primary alkaline dry cell comprising an anode substantially completely consisting of powdered molybdenum consolidated into a solid mass, an alkali metal hydroxide electrolyte, and a silver peroxide depolarizer cathode.

References Cited in the file of this patent

UNITED STATES PATENTS

| 1,788,571 | Gardiner | Jan. 13, 1931 |
| 2,422,045 | Ruben | June 10, 1947 |
| 2,699,458 | Schlecht | Jan. 11, 1955 |

FOREIGN PATENTS

| 414,286 | Great Britain | Dec. 19, 1932 |